(12) United States Patent
Koripella et al.

(10) Patent No.: US 7,048,897 B1
(45) Date of Patent: *May 23, 2006

(54) HYDROGEN GENERATOR UTILIZING CERAMIC TECHNOLOGY

(75) Inventors: Chowdary Ramesh Koripella, Scottsdale, AZ (US); Christopher K. Dyer, Westfield, NJ (US); Stephen P. Rogers, Phoenix, AZ (US); Dominic Francis Gervasio, Fountain Hills, AZ (US)

(73) Assignee: Motorola, Inc., Schaumburg, IL (US)

( * ) Notice: Subject to any disclaimer, the term of this patent is extended or adjusted under 35 U.S.C. 154(b) by 477 days.

This patent is subject to a terminal disclaimer.

(21) Appl. No.: 09/649,528

(22) Filed: Aug. 28, 2000

(51) Int. Cl.
| | |
|---|---|
| *B01J 8/00* | (2006.01) |
| *B01J 19/24* | (2006.01) |
| *C01B 3/26* | (2006.01) |

(52) U.S. Cl. .................. 422/198; 422/211; 422/222; 422/187; 422/188; 422/199; 423/651

(58) Field of Classification Search ........ 422/188–191, 422/211, 222, 198–199, 204; 48/61, 62 R, 48/76, 89, 119; 423/648.1, 650–651; 429/19
See application file for complete search history.

(56) References Cited

U.S. PATENT DOCUMENTS

| | | | |
|---|---|---|---|
| 4,973,777 A | | 11/1990 | Alagy et al. |
| 5,162,167 A | * | 11/1992 | Minh et al. ................... 429/30 |
| 5,534,328 A | * | 7/1996 | Ashmead et al. ........... 428/166 |
| 5,858,314 A | * | 1/1999 | Hsu et al. ................... 422/211 |
| 5,942,346 A | * | 8/1999 | Ahmed et al. ............... 429/20 |
| 5,961,932 A | | 10/1999 | Ghosh et al. |
| 6,096,286 A | * | 8/2000 | Autenrieth .................. 423/651 |
| 6,569,553 B1 | * | 5/2003 | Koripella et al. ............ 429/20 |

FOREIGN PATENT DOCUMENTS

| | | | |
|---|---|---|---|
| DE | 19716438 A1 | | 10/1998 |
| DE | 197 46 251 A1 | * | 4/1999 |
| DE | 19906672 A1 | | 8/2000 |
| EP | 0579942 A1 | | 1/1994 |
| EP | 1010462 A1 | | 6/2000 |
| JP | 06111838 A | * | 4/1994 |
| WO | WO 9739490 | | 10/1997 |
| WO | WO 9833587 | | 8/1998 |
| WO | WO 2002/18268 | * | 3/2002 |

OTHER PUBLICATIONS

Machine-Assisted Translation of JP 6-111838-A. Thomson Derwent, Oct. 12, 2004.*

* cited by examiner

*Primary Examiner*—Hien Tran
*Assistant Examiner*—Jennifer A. Leung

(57) ABSTRACT

A hydrogen generator including a three-dimensional multilayer ceramic carrier structure defining a fuel reformer. The reformer includes a vaporization zone and a reaction zone including a catalyst. The reformer is operational as either a steam reformer, a partial oxidation reformer or an autothermal reformer. The fuel reformer, or processor, further includes an inlet channel for liquid fuel and an outlet channel for hydrogen enriched gas. The fuel processor is formed utilizing multi-layer ceramic technology in which thin ceramic layers are assembled then sintered to provide miniature dimensions in which the encapsulated catalyst converts or reforms inlet fuel into a hydrogen enriched gas.

4 Claims, 3 Drawing Sheets

HYDROGEN GENERATOR UTILIZING CERAMIC TECHNOLOGY

FIELD OF INVENTION

The present invention pertains to hydrogen generators, and more particularly to hydrogen generators utilizing multi-layer ceramic technology for improved size and performance benefits.

BACKGROUND OF THE INVENTION

Hydrogen is attractive and has been used as the fuel in many types of devices, such as: in fuel cells for producing electricity, in combustion engines, including rockets or internal combustion engines, and in chemical processing devices, including those used in the refining of metallic components. Typically hydrogen, or more particularly, hydrogen enriched gas, is processed from methanol, natural gas, petroleum, or ammonia using a chemical reactor, typically called a hydrogen generator or reformer. A reformed hydrogen fuel cell (RHFC), utilizes hydrogen enriched gas processed from liquid or gaseous hydrocarbon fuels, such as methanol, using a fuel reformer.

Methanol is the preferred fuel for use in fuel reformers, or hydrogen generators, because methanol is easier to reform into hydrogen enriched gas at a relatively low temperature and yields a minimum number of gaseous by-products (carbon dioxide and carbon monoxide) compared to other hydrocarbon fuels such as natural gas, ethanol, petroleum, gasoline, or butane. This is especially important for small portable units, where the temperature of the reformer unit would be a concern. The reforming or converting of methanol into hydrogen enriched gas usually is accomplished using one of three different types of reforming processes. These three types are steam reforming, partial oxidation reforming, and autothermal reforming. Of these types, steam reforming is the preferred process for methanol reforming because it is the easiest to control, yields the minimum number of gaseous by-products (carbon dioxide and carbon monoxide), and produces a higher hydrogen output, at a lower temperature, thus lending itself to favored use. During steam reforming, raw methanol is catalytically converted, in the presence of water and with the application of heat, to a hydrogen enriched gas. Although, steam reforming is the preferred process, partial oxidation reforming and autothermal reforming are utilized in many instances. During partial oxidation reforming, raw methanol is converted to a hydrogen enriched gas through partial oxidation of methanol over a catalyst in a limited supply of oxygen or air to prevent complete oxidation. Since this is an exothermic reaction, it does not require heat input to proceed. The reaction will proceed without any additional heat input provided the methanol and oxygen are in contact with the proper catalyst. Control of oxygen partial pressure and temperature is very critical, and for portable methanol reforming, the higher operating temperature of the reformer is a concern.

Autothermal reforming is a combination of the catalytic partial oxidation and steam reforming process. During the autothermal methanol reforming process, the partial oxidation reaction which produces heat is carefully managed to provide sufficient heat for the steam reforming reaction. In an autothermal reformer, the reactions between the input reactants, namely the methanol, water and air (or $O_2$), are carefully balanced over the catalyst, to produce $CO_2$ and $H_2$ gases with minimum amount of CO. The partial oxidation step and steam reforming step may be done in the same or separate compartments during autothermal reforming.

Fuel reformers have been developed for use in conjunction with many new devices, including fuel cell devices. Many of these fuel cell devices include reformers which are typically cumbersome and complex devices consisting of several discrete sections connected together with gas plumbing and hardware to produce hydrogen gas. Accordingly, reformers have not been found suitable for portable power source applications, or in other applications requiring minimal size and weight. To date, no fuel reformer has been developed utilizing ceramic monolithic structures in which the miniaturization of the reformer has been achieved. Laminated ceramic components containing miniature channels and other features which utilize low pressure lamination ceramic technology, are now commonly being developed for use in microfluidic management systems. Monolithic structures formed of these laminated ceramic components provide for three-dimensional structures that are inert and stable to chemical reactions and capable of tolerating high temperatures as well as providing for miniaturized structures, with a high degree of electronic circuitry or components embedded or integrated into such a ceramic structure for system control and functionality. Additionally, the ceramic materials used to form ceramic devices, which have microchannels formed within the structure, are considered to be excellent candidates for catalyst supports in microreactor devices for generating hydrogen for supplying miniaturized fuel cells.

Accordingly, it is an object of the present invention to provide for a miniaturized hydrogen generator, or fuel processor, that provides for the reforming of a fuel to a hydrogen enriched gas.

It is yet another object of the present invention to provide for a monolithic structure for the reforming of a fuel to a hydrogen enriched gas.

It is still another object of the present invention to provide for a monolithic structure that is formed by utilizing ceramic technology, thereby providing for the integration of a plurality of internal plumbing interconnections and electrical circuitry and connections.

It is another object of the present invention to provide for a hydrogen generator, or fuel processor, that is miniaturized for use in conjunction with: (i) fuel cells for portable device applications; (ii) combustion devices; (iii) chemical processing devices; and (iv) other devices in which hydrogen enriched gas is consumed as fuel.

SUMMARY OF THE INVENTION

The above problems and others are at least partially solved and the above purposes and others are realized in a hydrogen generator including a three-dimensional multi-layer ceramic carrier structure defining a fuel reformer, or fuel processor. The fuel reformer includes a vaporization zone and a reaction zone including a reforming catalyst. The ceramic carrier further includes an inlet channel for liquid fuel and an outlet channel for the hydrogen enriched gas. The fuel reformer is formed utilizing ceramic technology in which thin ceramic layers are assembled then sintered to provide miniature dimensions in which the encapsulated catalyst converts or reforms inlet fuel into a hydrogen enriched gas.

BRIEF DESCRIPTION OF THE DRAWINGS

The novel features believed characteristic of the invention are set forth in the claims. The invention itself, however, as well as other features and advantages thereof will be best understood by reference to detailed descriptions which follow, when read in conjunction with the accompanying drawings, wherein:

DESCRIPTION OF THE PREFERRED EMBODIMENTS

Figure 1:
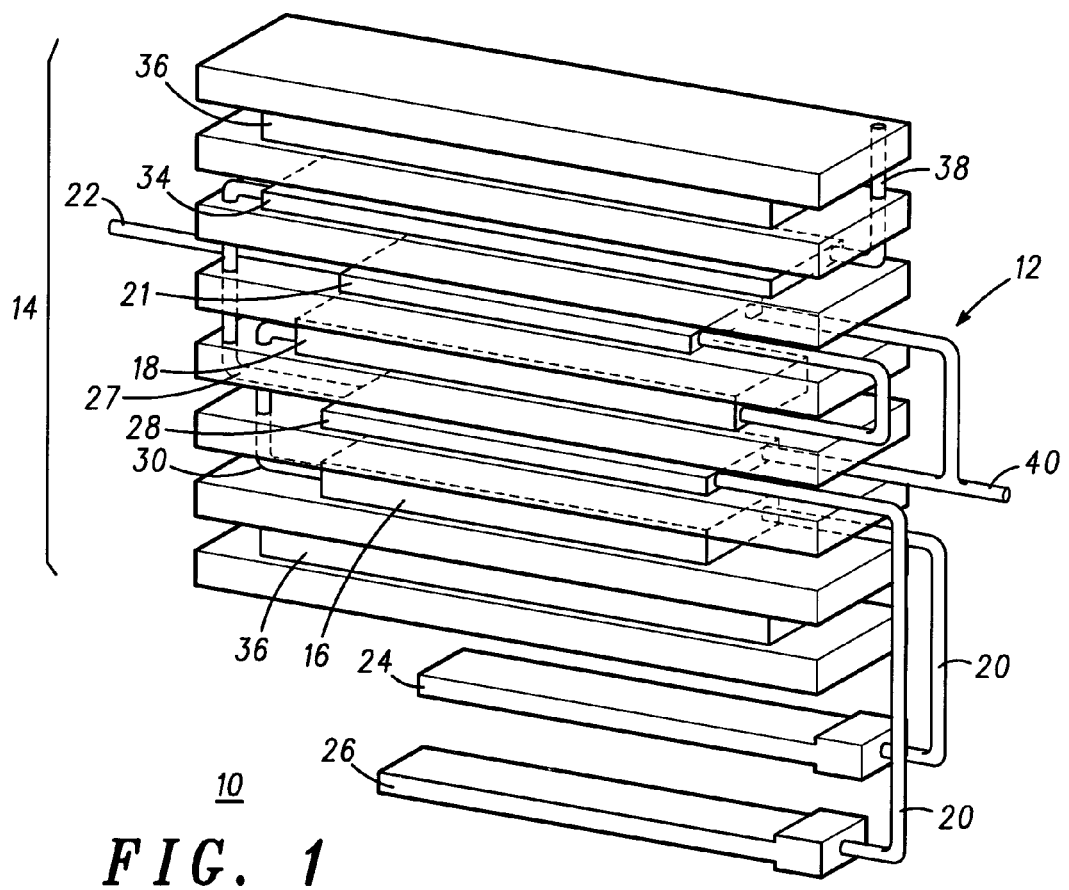
FIG. 1 is a simplified orthogonal view of a hydrogen generator including a plurality of channels, according to the present invention.

Turning now to the drawings, and in particular FIG. 1, illustrated in simplified orthogonal view is a hydrogen generator 10 including a plurality of channels, according to the present invention. Hydrogen generator 10 is comprised of a three-dimensional multi-layer ceramic structure 12. Ceramic structure 12 is formed utilizing multi-layer laminate ceramic technology. Structure 12 is typically formed in component parts which are then sintered in such a way as to provide for a monolithic structure. Ceramic structure 12 has defined therein a fuel reformer, or fuel processor, generally referenced 14. Fuel reformer 14 includes a vaporization chamber, or vaporization zone, 16, a reaction chamber, or reaction zone, 18, and an integrated heat source 28. Ceramic structure 12 further includes at least one fuel inlet channel 20 in communication with a liquid fuel source of a combination solution methanol/water source 24 and a pure methanol source 26 and a hydrogen enriched fuel outlet channel 22. It should be understood that in a different embodiment, separate methanol and pure water fuel sources can be used. In this instance the methanol would need to be in direct communication with the heater and a mixer would need to be utilized for mixing of the methanol and water fuel source.

During operation, heat is efficiently transferred from the central aspect of the device, more particularly an integrated heater, or heat source 28, to the reaction zone 18 and fuel vaporizer, or vaporization zone 16 using thermal conductive channels, or vias, (discussed presently). In this particular embodiment, integrated heater 28 is described as a chemical heater, including a catalyst and arranged so as to oxidize fuel to produce heat, but it should be understood that the integration of an electrical heater is anticipated by this disclosure. Chemical heater 28 includes an air port 40 for providing oxygen for oxidation of fuel 24 and/or 26 and an inlet channel 20, for providing fuel 24 and/or 26 to heater 28.

Output from fuel vaporizer zone 16 travels via structure 30 to reaction zone 18 and then through hydrogen enriched gas outlet channel 22. Optionally included is a preferential oxidation reactor 21. During operation, output from reaction zone 18 travels to preferential oxidation reactor 21 where CO is preferentially cleaned up from the output gasses to below 30 ppm for fuel cell use. Alternatively, when a high temperature fuel cell is utilized, design 10 would not include preferential oxidation reactor 21 due to the ability for high temperature fuel cells to tolerate up to a combined total of 5% (mol) CO and methanol. Additionally, included in design 10 is a waste heat recovery zone 34 for the capture of heat from spent gases from an external device, such as a fuel cell stack, (not shown) through an inlet channel (not shown) and from chemical heater 28 through channel 27.

An efficient thermal insulator 36 is positioned about fuel reformer 14 to keep outer temperatures low for packaging and also to keep heat localized to the fuel reformer. In this particular embodiment, the fuel processor operates at a temperature ranging from ambient to 300° C. unless it is integrated with a high temperature fuel cell where the fuel processor operates in a range of 140–300° C. Fuel vaporizer zone 16 operates at a temperature ranging from 120–160° C. and reaction zone 18 operates at a temperature ranging from 200–250° C. Additionally, in this particular embodiment of fuel processor 14, included is an exhaust gas vent 38, for the venting of exhaust gases generated by device 10.

It should be understood that alternative embodiments encompassing alternative fuel delivery means and fuel vaporizer, reaction zone, and chemical heater positions are anticipated by this disclosure. In particular, anticipated is an embodiment in which only a single fuel supply, namely methanol and water, is anticipated. This use of a single methanol and water solution would enable the fabrication of a simpler design, without any need for the device to incorporate two fuel tanks. Although it is understood that pure methanol is more efficient and preferred with respect to the chemical heater, a 1 mole water and 1 mole methanol solution will also work, but is not deemed literally as operationally efficient. Further, a heater using the water and methanol solution is suitable for practical applications, and would permit a simple common fuel reservoir for feeding the heater and reformer chambers. In this instance, the fuel delivery would be split into two chambers, the chemical heater 28 and fuel vaporizer 16.

Next, anticipated are variations on the actual design of device 10 and more particularly to the actual location of the fuel vaporizer zone 16, reaction zone 18 and chemical heater 28. In one particular alternative embodiment, it is anticipated that reaction zone 18 surrounds chemical heater 28 on both sides (top and bottom). In yet another alternative embodiment, it is anticipated that reaction zone 18 can be positioned below heater 28 and the fuel vaporizer zone 16 on top of the chemical heater 28. In addition, and as previously stated, it is anticipated that chemical heater 28 can alternatively be an electrical heater (not shown).

Finally, it is anticipated by this disclosure that although illustrated in FIG. 1 is a design in which a fuel cell is not integrated with reformer 14, it is additionally anticipated, that a fuel cell (not shown) can be monolithically integrated with hydrogen generator 10. Further information on a reformed hydrogen fuel system device including an integrated fuel cell stack can be found in U.S. patent application Ser. No. 09/649,553, simultaneously filed herewith, entitled "FUEL PROCESSOR WITH INTEGRATED FUEL CELL UTILIZING CERAMIC TECHNOLOGY", assigned to the same assignee and incorporated herein by this reference.

Figure 2:
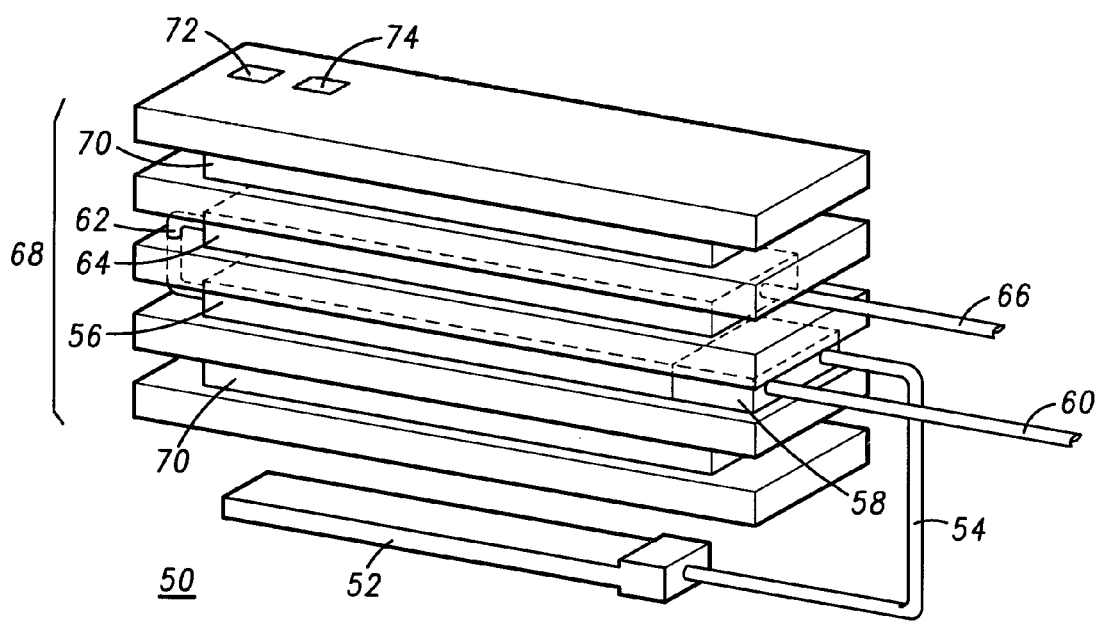
FIG. 2 is a simplified orthogonal view of an alternative embodiment of the hydrogen generator according to the present invention.

Referring now to FIG. 2, illustrated is a partial oxidation hydrogen generator according to the present invention, generally referenced 50. Partial oxidation reformer, or generator 50 provides for part of the fuel to be oxidized to provide energy for the reforming reaction within the fuel reformer. Direct heat transfer makes this reformer small, compact, light weight and dynamically responsive. Partial oxidation systems rely on the reaction of the feedstock in a limited supply of oxygen or air to prevent complete oxidation. Partial oxidation is an exothermic reaction and in this process, the temperature of the reformer can exceed 400° C. Control of the oxygen partial pressure is very critical. Partial oxidation is not typically used for methanol reformers, and is more commonly utilized in association with gasoline reformers for automotive applications where the temperatures can exceed 650° C.

As illustrated, hydrogen generator 50 includes a fuel 52, input through inlet 54, to a partial oxidation reactor 56. During operation, fuel 52, typically methanol, is first oxidized by a chemical heater or electrical igniter, 58 over a catalyst. Once the partial oxidation reaction starts, the heat generated will sustain the reaction. There is no need to provide additional heat as in the steam reformer described with reference to FIG. 1. During operation, the reaction needs to be controlled so that it does not proceed to complete oxidation. This is achieved by monitoring the oxygen partial pressure and temperature and by controlling the air intake 60 and fuel feed or inlet 54.

Fuel 52 travels via inlet 54 to fuel reformer 68, more particularly to first partial oxidation reactor 56 and then via channel 62, to a second partial oxidation reactor 64. An enriched hydrogen fuel outlet 66 serves to direct the reformed hydrogen fuel toward an externally connected fuel cell (not shown).

An efficient thermal insulator 70 is positioned about partial oxidation reactors 56 and 64 to keep outer temperatures low for packaging and also to keep heat localized to the fuel reformer. It is anticipated by this disclosure that although illustrated in FIG. 2 is a design in which a fuel cell is not integrated with reformer 68, it is additionally anticipated, that a fuel cell (not shown) can be monolithically integrated with hydrogen generator 50. In this particular design, hydrogen generator 50 includes a temperature sensor 72 and an oxygen partial pressure, $PO_2$, sensor 74.

As illustrated in FIG. 2, partial oxidation hydrogen generator 50 converts oxygen and methanol mainly into hydrogen and carbon dioxide with a small amount of carbon monoxide. Since the partial oxidation reaction is an exothermic reaction, this reforming reaction does not require the addition of heat. The reforming is performed over a temperature range of 200° C.–400° C. CO cleanup is achieved in much the same way as was done with the steam reformer illustrated in FIG. 1.

Figure 3:
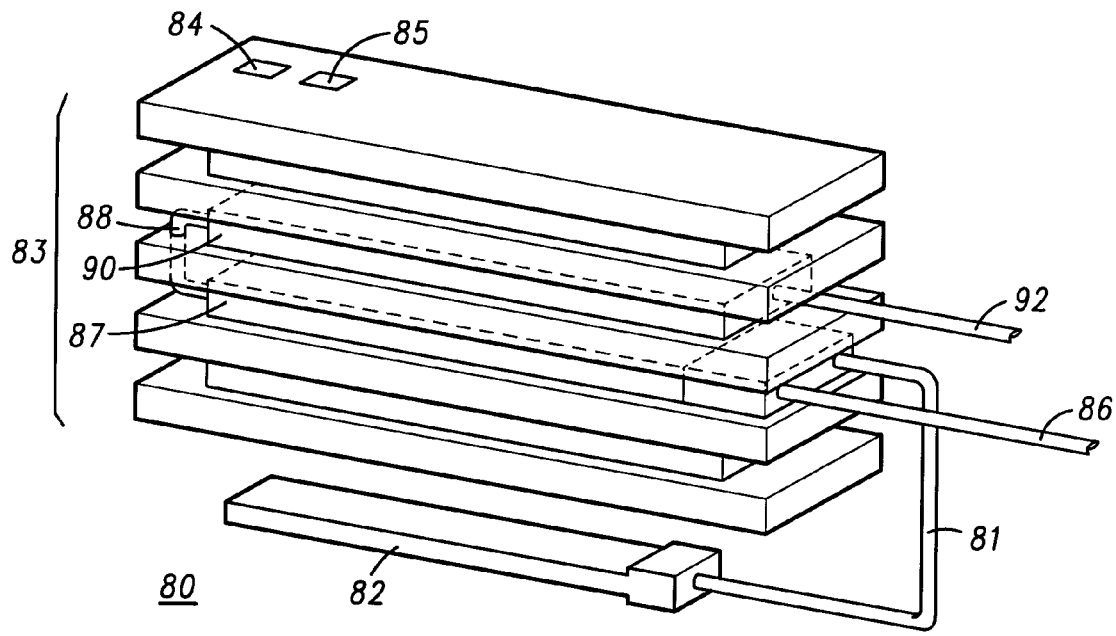
FIG. 3 is a simplified orthogonal view of an alternative embodiment of the hydrogen generator according to the present invention.

Referring now to FIG. 3, illustrated is an autothermal hydrogen generator according to the present invention, generally referenced 80. Autothermal reforming is a combination of both steam reforming, an endothermic reaction which requires heat input described with reference to FIG. 1, and partial oxidation reforming, an exothermic reaction which produces heat, described with reference to FIG. 2. In autothermal reforming, a balance of both of these reforming processes is achieved. More particularly, autothermal reforming converts fuel 82, more particularly water, oxygen and methanol, to hydrogen and carbon dioxide without the requirement of the addition of heat.

Fuel 82 travels via inlet 81 to a fuel reformer 83, more particularly to the first stage of the autothermal reactor 87 involving partial oxidation of some of the methanol. The fuel stream is interconnected via channel 88, to a second stage of the autothermal reactor 90 involving steam reforming of the methanol. These two reforming stages may occur either in the same compartment or in two sequential separate compartments. Either way, an enriched hydrogen fuel outlet 92 serves to direct the reformed hydrogen fuel toward an externally connected fuel cell (not shown).

Temperature sensor 84 and an oxygen partial pressure sensor 85 are utilized to monitor the reaction process. In particular, sensors 84 and 85 control the fuel feed (methanol and water), 82, and oxygen supply 86. If there is too much oxygen present then the reaction can proceed towards complete oxidation, consuming excess fuel, and producing unwanted excessive heat. In contrast, if sufficient heat is not produced due to partial oxidation reaction, then coking can result, hindering the steam reforming process. Autothermal methanol reforming proceeds in the temperature range of 200–300° C. with the use of proper catalyst(s). CO cleanup is achieved in much the same way as was discussed with the steam reformer illustrated in FIG. 1.

Figure 4:
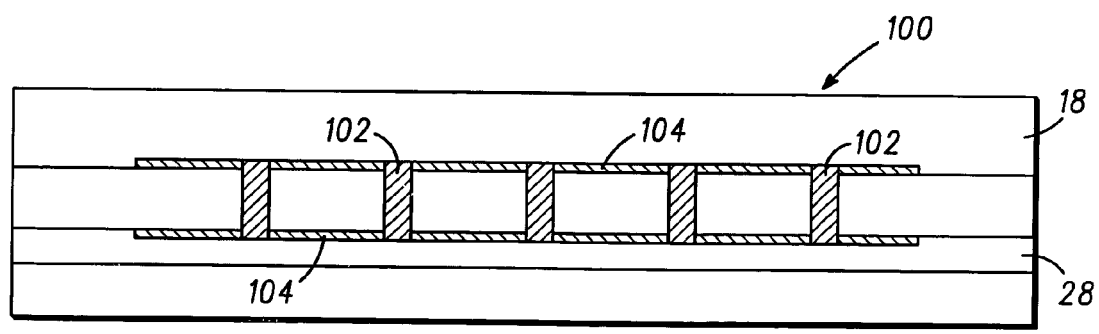
FIG. 4 is a simplified sectional views of a thermally conductive channels or vias according to the present invention.

Referring now to FIG. 4, illustrated in simplified cross-sectional view is a thermal transfer structure, referenced 30. Structure 30 is comprised of channels 102 or vias connected with a metal film 104 in intimate contact with the various zones 18 and 28, as illustrated. It should be understood that structure 30 is generally utilized for transfer of heat efficiently between chemical heater 28 and fuel vaporizer zone 16 and reaction zone 18, as well as between waste heat recovery 34 and reaction zone 18, or any other zone where thermal transfer needs to occur. As illustrated, thermal conductive structure 30 includes multi-layer ceramic layers 100 used in the fabrication of the monolithic structure, referenced 12 in FIG. 1. Identified is chemical heater section 28 and reaction zone chamber 18. Thermally conductive thick-film metal vias 102 thermally couple the top and bottom sections efficiently for good heat transfer. A thick-film metal layer 104, in intimate contact with chemical heater zone 28 and reaction zone 18, spreads and uniformly heats these sections.

Figure 5:
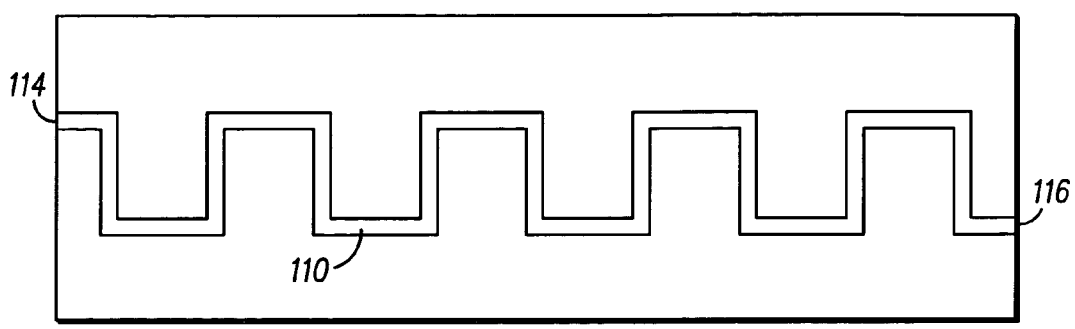
FIGS. 5 and 6 are simplified sectional views of alternative embodiments of thermally controlled vaporizer/reaction zone channels according to the present invention.
Figure 6:
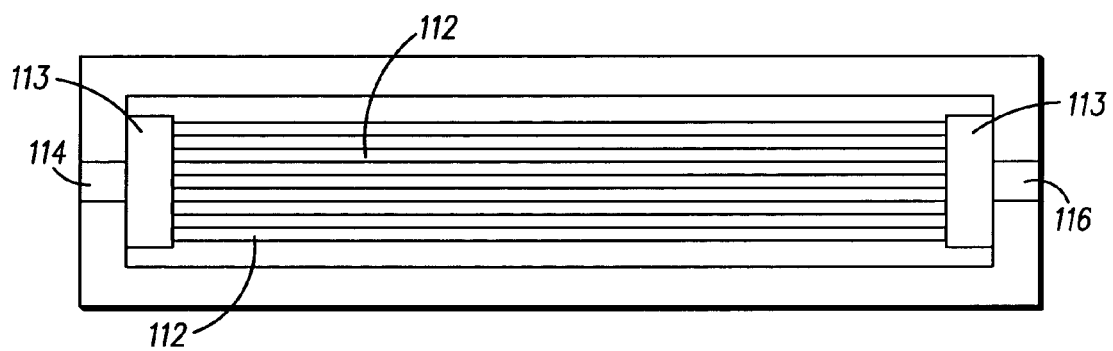

Referring now to FIGS. 5 and 6, illustrated in simplified cross-sectional or plan view is a portion of fuel vaporizer zone 16. More particularly, illustrated in FIG. 5 is a serpentine channel 110, that is typically filled or coated with an inert porous ceramic material for thermal control. Alternatively, vaporizer 16 can be formed of a multiplicity of parallel channels 112, with an inert porous ceramic material for thermal control, in communication with a porous diffuser 113. In each instance, serpentine channel 110 or parallel channel 112 includes a combined single liquid inlet feed 114 at one end and combining into a single vapor outlet at the other end 116. Serpentine channels 110 and parallel channels 112, are formed in the multi-layer ceramic structure, previously identified as 12. Reaction zone 18 includes similarly designed channels and features as found in the vaporizer zone, discussed above. More particularly, reaction zone 18 includes a reforming catalyst. The catalyst is present as channel wall coatings or as a porous packed bed of catalyst particles. One design goal is to reduce the dimensionality of the reactor channels to the order of a gas diffusion length and control gas residence times, or gas space velocity, that are favorable to reaction kinetics. A multiplicity of parallel reactor channels, generally similar to channels 112, provide for high gas throughput and minimizes back pressure issues as related to channel blockage. It should be understood that it is anticipated by this disclosure that vaporizer zone 16 and reaction zone 18 may include in addition to, or in lieu of, serpentine channels 110 and parallel channels 112, any number of cavities or chambers, or any combination of channels, cavities, or chambers, thereof.

Figure 7:
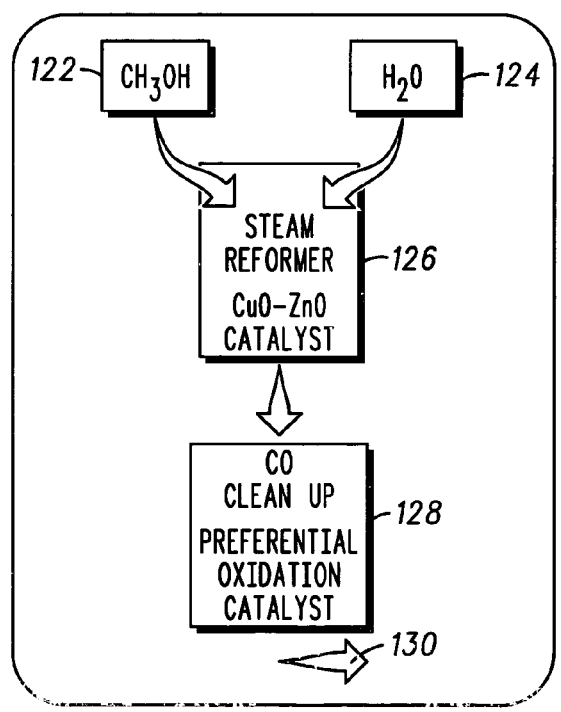
FIG. 7 is a simplified flow diagram of a method of reforming fuel according to the present invention.

Illustrated in FIG. 7 in a simplified flow chart diagram, is the chemical reaction 120 that takes place in a steam reforming hydrogen generator, and more particularly in reformer 14 of device 10, as illustrated in FIG. 1. As illustrated, methanol 122 and water 124 are input into a steam reformer 126, generally similar to reformer 14 of FIG. 1. Steam reformer 126 operates at a temperature of approximately 250° C. to reform the input methanol 122 and water 124 into a reformed gas mixture, generally referred to as the hydrogen enriched gas. More particularly, in the presence of a catalyst, such as copper oxide, zinc oxide, or copper zinc oxide, the methanol 122 and water 124 solution is reformed into hydrogen, carbon dioxide, and some carbon monoxide. Steam reformer 126 operates in conjunction with an optional carbon monoxide cleanup 128, that in the presence of a preferential oxidation catalyst and air (or $O_2$), reforms a large percentage of the present carbon monoxide into carbon dioxide. This reformed gas mixture supplies fuel through fuel output 130 to an external device, such as a fuel cell.

Accordingly, described is a hydrogen generator including a ceramic carrier defining a reaction zone including a catalyst. The ceramic carrier further includes a heat source thermally coupled to the reaction zone. An inlet channel is supplied for input of the liquid fuel to the fuel processor and an outlet channel is supplied for the output of the reformed gas mixture. The fuel processor device is formed as a monolithically integrated structure, generally comprised of a plurality of thin ceramic layers assembled and then sintered in such a way as to provide for the closed heating zones in which the encapsulated catalysts reforms the inlet fuel into mostly hydrogen gas suitable for supplying fuel via a suitable conduit to an other external device in fluidic communication or integrated monolithically with internal conduits.

While we have shown and described specific embodiments of the present invention, further modifications and improvements will occur to those skilled in the art. We desire it to be understood, therefore, that this invention is not limited to the particular forms shown and we intend in the appended claims to cover all modifications that do not depart from the spirit and scope of this invention.

What is claimed is:

1. A hydrogen generator comprising:
a fuel processor being collectively defined by,
   an inlet channel for transporting a liquid fuel;
   a vaporization zone receiving liquid fuel from the inlet channel;
   at least one vapor channel for transporting vaporized liquid fuel from the vaporization zone to a reaction zone; the reaction zone including a reforming catalyst for reforming the vaporized liquid fuel into a hydrogen enriched gas;
   an outlet channel for transporting the hydrogen enriched gas out of the reaction zone; and
   a chemical heater further receiving liquid file from the inlet channel; the chemical heater being thermally coupled to the reaction zone and the vaporization zone using thermally conductive channels or thermally conductive vias; the chemical heater including a catalyst and an air inlet for receiving oxygen for the oxidation of the fuel to produce heat;
wherein the inlet channel, the vaporization zone, the at least one vapor channel, the reaction zone, the outlet channel and the chemical heater are formed within a plurality of individual ceramic layers that are assembled and subsequently sintered together to form a single, three-dimensional, integral, monolithic, ceramic carrier structure.

2. The hydrogen generator as claimed in claim 1, wherein at least one of the vaporization zone and the reaction zone include a plurality of parallel channels or at least one serpentine channel.

3. A hydrogen generator comprising:
a fuel processor being collectively defined by,
   an inlet channel for transporting a liquid fuel;
   a vaporization zone receiving liquid fuel from the inlet channel;
   at least one vapor channel for transporting vaporized liquid fuel from the vaporization zone to a reaction zone; the reaction zone including a reforming catalyst for reforming the vaporized liquid fuel into a hydrogen enriched gas;
   an outlet channel for transporting the hydrogen enriched gas out of the reaction zone; and
   a heater thermally coupled to the reaction zone and the vaporization zone using thermally conductive channels or thermally conductive vias; the heater comprising an electrically driven resistive heater or a chemical heater further receiving liquid fuel from the inlet channel; the chemical heater including a catalyst and an air inlet for receiving oxygen for the oxidation of the liquid fuel to produce heat;
wherein at least one of the vaporization zone and the reaction zone comprises a plurality of parallel channels or at least one serpentine channel; and
the inlet channel, the vaporization zone, the at least one vapor channel, the reaction zone, the outlet channel and the heater are formed within a plurality of individual ceramic layers that are assembled and subsequently sintered together to form a single, three-dimensional, integral, monolithic, ceramic carrier structure.

4. A hydrogen generator comprising:
a fuel processor being collectively defined by,
   an inlet channel for transporting a liquid fuel;
   a vaporization zone receiving liquid fuel from the inlet channel;
   at least one vapor channel for transporting vaporized liquid fuel from the vaporization zone to a reaction zone; the reaction zone including a reforming catalyst for reforming the vaporized liquid fuel into a hydrogen enriched gas;
   an outlet channel for transporting the hydrogen enriched gas out of the reaction zone; and
   a heater thermally coupled to the reaction zone and the vaporization zone using thermally conductive structures; the heater comprising an electrically driven resistive heater or a chemical heater further receiving liquid fuel from the inlet channel; the chemical heater including a catalyst and an air inlet for receiving oxygen for the oxidation of the liquid fuel to produce heat;
wherein at least one of the vaporization zone and the reaction zone comprises a plurality of parallel channels or at least one serpentine channel; and
the inlet channel, the vaporization zone, the at least one vapor channel, the reaction zone, the outlet channel and the heater are formed within a plurality of individual ceramic layers that are assembled and subsequently sintered together to form a single, three-dimensional, integral, monolithic, ceramic carrier structure.

* * * * *